(12) United States Patent
Durocher et al.

(10) Patent No.: US 12,630,292 B2
(45) Date of Patent: May 19, 2026

(54) AIRCRAFT AND ASSOCIATED METHOD OF CONDITIONING CABIN AIR

(71) Applicant: PRATT & WHITNEY CANADA CORP., Longueuil (CA)

(72) Inventors: Eric Sylvain Durocher, Boucherville (CA); Michel Labrecque, Sainte-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 277 days.

(21) Appl. No.: 18/334,502

(22) Filed: Jun. 14, 2023

(65) Prior Publication Data

US 2024/0417079 A1      Dec. 19, 2024

(51) Int. Cl.
B64D 13/08          (2006.01)
B64D 27/24          (2024.01)
(Continued)

(52) U.S. Cl.
CPC ............. B64D 13/08 (2013.01); B64D 27/24 (2013.01); H01M 10/613 (2015.04); *B64D 2013/0614* (2013.01); *H01M 2220/20* (2013.01)

(58) Field of Classification Search
CPC .................... B64D 13/08; B64D 27/24; B64D 2013/0614; B64D 2013/0674; B64D 13/06; H01M 10/613; H01M 2220/20
(Continued)

(56) References Cited

U.S. PATENT DOCUMENTS 2,767,561 A * 10/1956 Seeger ................... B64D 13/06
                                                              62/177
3,177,679 A *  4/1965 Quick .................... B64D 13/06
                                                              454/71
(Continued)

FOREIGN PATENT DOCUMENTS

DE       102016223531 A1    5/2018
EP           3753851 A2    12/2020

*Primary Examiner* — Len Tran
*Assistant Examiner* — Kirstin U Oswald
(74) *Attorney, Agent, or Firm* — Norton Rose Fulbright Canada LLP

(57) ABSTRACT

The aircraft can have a cabin adapted to receive one or more persons; a rotary airfoil device; an electric engine drivingly coupled to the rotary airfoil device; a battery powering the electric engine; a coolant subsystem having a coolant circuit and a coolant pump operable to circulate a coolant in the coolant circuit, the coolant circuit connected in heat exchange relationship with at least one of the electric engine and the battery; a heat pump having a refrigerant circuit fluidly connecting, in sequence, a compressor, a condenser, an expansion valve, a first evaporator, and an environmental control line branching off from the refrigerant circuit between the condenser and the first evaporator, the environmental control line having a second evaporator and reconnected to the refrigerant circuit between the first evaporator and the compressor, the first evaporator connected in heat exchange relationship with the coolant circuit; and a pressurized air subsystem having a pressurized air line operable to deliver pressurized air from a pressurized air source to the cabin, the pressurized air line connected in heat exchange relationship with the second evaporator.

20 Claims, 8 Drawing Sheets

(51) Int. Cl.
H01M 10/613 (2014.01)
B64D 13/06 (2006.01)
(58) Field of Classification Search
USPC ........................................................... 62/239
See application file for complete search history.

(56) References Cited

U.S. PATENT DOCUMENTS

| | | | | |
|---|---|---|---|---|
| 3,494,145 | A * | 2/1970 | Davis | F25B 9/06 62/88 |
| 4,263,786 | A * | 4/1981 | Eng | B64D 13/06 62/89 |
| 4,272,967 | A * | 6/1981 | White | F24F 1/04 62/239 |
| 4,430,867 | A * | 2/1984 | Warner | B64D 13/06 62/402 |
| 4,434,624 | A * | 3/1984 | Cronin | F25B 27/00 62/434 |
| 4,487,034 | A * | 12/1984 | Cronin | F25B 27/00 62/196.3 |
| 4,523,517 | A * | 6/1985 | Cronin | B64D 13/06 237/2 A |
| 4,531,379 | A * | 7/1985 | Diefenthaler, Jr. | B60H 1/3226 60/714 |
| 4,684,081 | A * | 8/1987 | Cronin | B64D 13/06 244/53 A |
| 4,896,499 | A * | 1/1990 | Rice | F02C 6/003 60/39.182 |
| 5,086,622 | A * | 2/1992 | Warner | B64D 13/06 62/88 |
| 5,461,882 | A * | 10/1995 | Zywiak | B64D 13/06 62/401 |
| 5,813,630 | A * | 9/1998 | Williams | B64D 41/00 454/71 |
| 5,899,085 | A * | 5/1999 | Williams | B64D 13/06 62/236 |
| 6,128,909 | A * | 10/2000 | Jonqueres | B64D 13/06 62/93 |
| 6,948,331 | B1 * | 9/2005 | Ho | B64D 13/06 62/401 |
| 7,673,459 | B2 * | 3/2010 | Sheldon | F01D 13/02 60/785 |
| 7,975,499 | B2 * | 7/2011 | DeFrancesco | F25B 25/005 62/239 |
| 8,118,257 | B2 * | 2/2012 | Wilmot, Jr. | B64D 13/06 62/239 |
| 8,882,030 | B2 * | 11/2014 | Loison | B64D 13/06 244/53 A |
| 8,915,095 | B2 * | 12/2014 | Bruno | B64D 13/06 62/333 |
| 8,978,351 | B2 | 3/2015 | Suciu et al. | |
| 9,482,451 | B2 * | 11/2016 | Vaisman | F25B 29/003 |
| 9,657,969 | B2 | 5/2017 | Vaisman et al. | |
| 10,202,197 | B2 * | 2/2019 | Bammann | F25B 49/02 |
| 10,501,191 | B1 * | 12/2019 | Dooley | B64D 13/06 |
| 11,820,519 | B2 | 11/2023 | Zug | |
| 12,049,297 | B2 | 7/2024 | Manohar et al. | |
| 2008/0264084 | A1 | 10/2008 | Derouineau | B64D 13/06 62/401 |
| 2010/0064701 | A1 * | 3/2010 | Bruno | B64D 13/06 62/515 |
| 2011/0005244 | A1 * | 1/2011 | Finney | F25B 9/06 62/87 |
| 2012/0312037 | A1 * | 12/2012 | Finney | B64D 37/34 62/115 |
| 2013/0118194 | A1 * | 5/2013 | Mar | B64D 13/08 62/426 |
| 2014/0277869 | A1 * | 9/2014 | King | B60W 10/26 701/22 |
| 2015/0251765 | A1 * | 9/2015 | Jonqueres | B64D 13/08 62/401 |
| 2016/0107748 | A1 * | 4/2016 | Luyks | B64D 31/18 416/151 |
| 2016/0248129 | A1 * | 8/2016 | Dunham | H01M 10/625 |
| 2017/0054188 | A1 * | 2/2017 | Blatchley | H01M 10/613 |
| 2017/0129614 | A1 * | 5/2017 | Bammann | B64D 13/06 |
| 2018/0050807 | A1 * | 2/2018 | Kupiszewski | H02J 4/00 |
| 2018/0057174 | A1 | 3/2018 | Klimpel et al. | |
| 2018/0215475 | A1 * | 8/2018 | Hurt | B64D 13/08 |
| 2018/0305036 | A1 | 10/2018 | Vondrell et al. | |
| 2019/0023385 | A1 * | 1/2019 | Nguyen | B64D 31/16 |
| 2019/0070924 | A1 | 3/2019 | Mancini et al. | |
| 2019/0128570 | A1 * | 5/2019 | Moxon | H01M 10/6556 |
| 2019/0203735 | A1 * | 7/2019 | Hoefler | F02C 7/141 |
| 2019/0341661 | A1 * | 11/2019 | Guerra | B60L 53/16 |
| 2019/0351740 | A1 | 11/2019 | Filipkowski et al. | |
| 2020/0010208 | A1 | 1/2020 | Peace et al. | |
| 2020/0086998 | A1 | 3/2020 | Retersdorf et al. | |
| 2020/0108937 | A1 * | 4/2020 | Behrens | F02C 9/18 |
| 2020/0140096 | A1 | 5/2020 | Bammann et al. | |
| 2020/0332716 | A1 * | 10/2020 | Ribarov | F02C 7/224 |
| 2021/0053689 | A1 | 2/2021 | Lynn et al. | |
| 2021/0122487 | A1 * | 4/2021 | Hagshenas | B64D 41/00 |
| 2021/0229802 | A1 | 7/2021 | Karem et al. | |
| 2021/0300544 | A1 | 9/2021 | Scholl et al. | |
| 2021/0347490 | A1 * | 11/2021 | Landers | F02D 28/00 |
| 2022/0177146 | A1 * | 6/2022 | Forster | H01M 10/667 |
| 2022/0185485 | A1 | 6/2022 | Galzin et al. | |
| 2022/0186665 | A1 | 6/2022 | Corbin et al. | |
| 2022/0368197 | A1 | 11/2022 | Hinderliter | |
| 2022/0402414 | A1 | 12/2022 | Wolas et al. | |
| 2024/0190574 | A1 * | 6/2024 | Ostdiek | B64D 27/33 |

* cited by examiner

AIRCRAFT AND ASSOCIATED METHOD OF CONDITIONING CABIN AIR

TECHNICAL FIELD

The application relates generally to electrically powered aircraft and, more particularly, to methods and systems for managing the temperature of cabin air.

BACKGROUND OF THE ART

Many aircrafts have environmental control systems which provide an air supply for persons in the cabin, such as pilot, crew, and/or passengers. The environmental control system may provide for cabin pressurization when the aircraft is high in the atmosphere, where atmospheric pressure is lower. The environmental control system may also provide for conditioning the air, and more specifically controlling the temperature of the air in the cabin. In particular, cabin air may benefit from heating, such as for comfort at high altitudes, or may benefit from cooling, such as when grounded or taxiing in warmer climates. Various contextual elements may motivate aircraft component designers to find new solutions, and the use of electric powerplants is relatively recent in the field of aircraft engines. Moreover, aircraft engine designers evolve in a complex environment where many factors are to be accounted for, such as volume, weight, costs (both initial and maintenance-related), assembly considerations, reliability, etc.

SUMMARY

In one aspect, there is provided an aircraft comprising: a cabin adapted to receive one or more persons; a rotary airfoil device; an electric engine drivingly coupled to the rotary airfoil device; a battery powering the electric engine; a coolant subsystem having a coolant circuit and a coolant pump operable to circulate a coolant in the coolant circuit, the coolant circuit connected in heat exchange relationship with at least one of the electric engine and the battery; a heat pump having a refrigerant circuit fluidly connecting, in sequence, a compressor, a condenser, an expansion valve, a first evaporator, and an environmental control line branching off from the refrigerant circuit between the condenser and the first evaporator, the environmental control line having a second evaporator and reconnected to the refrigerant circuit between the first evaporator and the compressor, the first evaporator connected in heat exchange relationship with the coolant circuit; and a pressurized air subsystem having a pressurized air line operable to deliver pressurized air from a pressurized air source to the cabin, the pressurized air line connected in heat exchange relationship with the second evaporator.

In another aspect, there is provided a method of conditioning cabin air of an aircraft having a cabin, a pressurized air line fluidly connecting the cabin, an electric engine powered by a battery, the electric engine drivingly coupled to a rotary airfoil device, and a heat pump, the method comprising: circulating a coolant in a coolant circuit; driving a flow of pressurized air in the pressurized air line; circulating a refrigerant in the heat pump; transferring heat from at least one of the electric engine and the battery to the coolant; transferring heat from the coolant to the refrigerant; transferring heat from the pressurized air to the refrigerant; and delivering the pressurized air to the cabin subsequently to said transferring heat from the pressurized air.

In a further aspect, there is provided an aircraft comprising: a cabin adapted to receive one or more persons; a rotary airfoil device; an electric engine drivingly coupled to the rotary airfoil device; a battery powering the electric engine; a lubricant subsystem having a lubricant circuit and a lubricant pump operable to circulate a lubricant in the lubricant circuit; a heat pump having a refrigerant circuit fluidly connecting, in sequence, a compressor, a condenser, an expansion valve, a first evaporator, and an environmental control line branching off from the refrigerant circuit between the condenser and the first evaporator, the environmental control line having a second evaporator and reconnected to the refrigerant circuit between the first evaporator and the compressor, the first evaporator connected in heat exchange relationship with the lubricant circuit; and a pressurized air subsystem having a pressurized air line operable to deliver pressurized air from a pressurized air source to the cabin, the pressurized air line connected in heat exchange relationship with the second evaporator.

DESCRIPTION OF THE DRAWINGS

Reference is now made to the accompanying figures in which.

DETAILED DESCRIPTION

Figure 1:
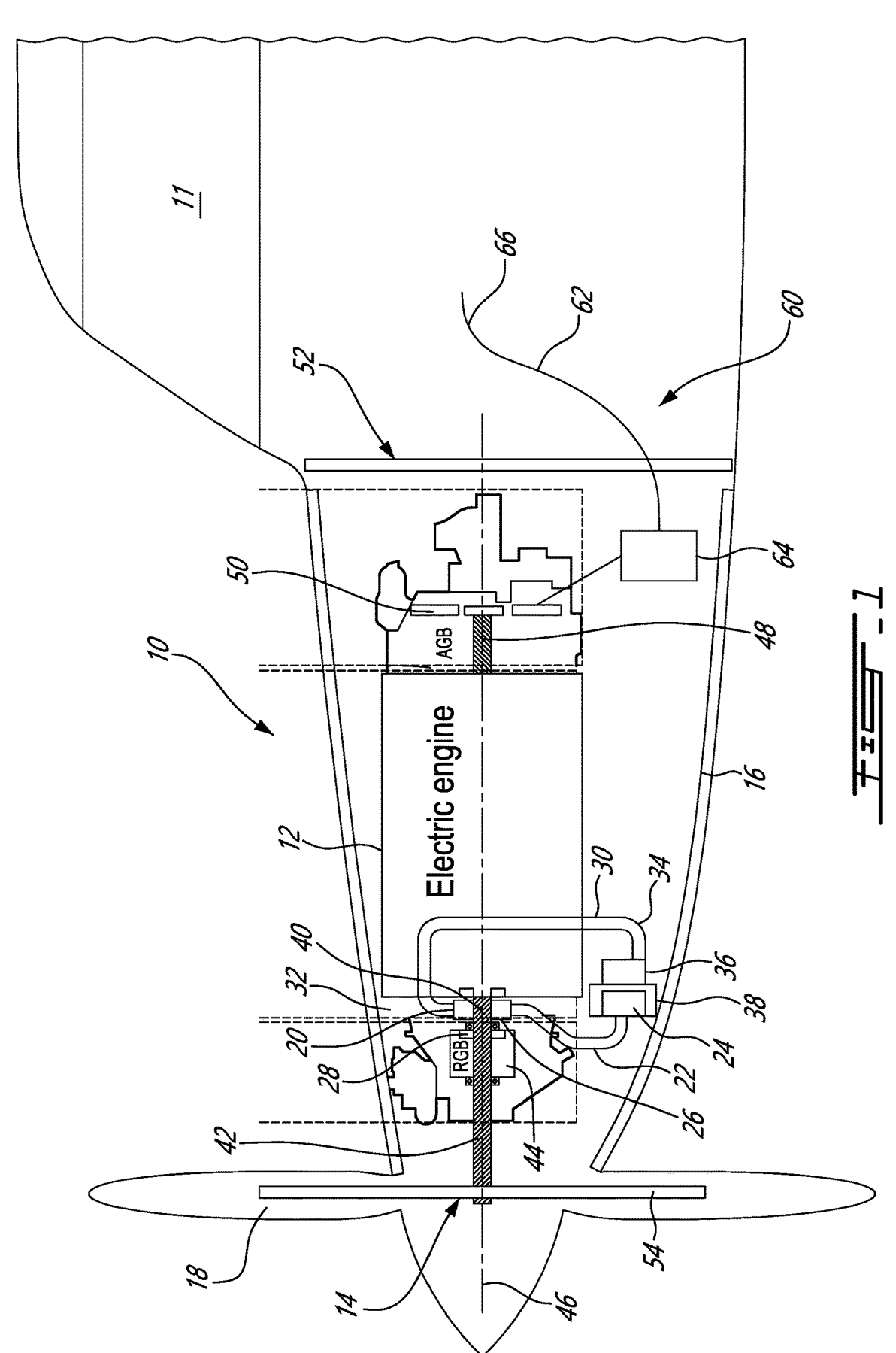
FIG. 1 is a schematic cross-sectional view of an example of an electric powerplant installation in an aircraft.

FIG. 1 illustrates an example aircraft having a cabin 11 and an electric powerplant 10. The cabin can be adapted to receive one or more persons, such as one or more pilot, other crew members, and/or passengers. The cabin can be partitioned from the atmosphere and configured to be pressurized. An environmental control system 60 may be provided to deliver pressurized air to the cabin 11. The environmental control system 60 can include a pressurized air line 62 having an inlet coupled to a pressurized air source 64 such as an air compressor, and one or more outlets 66 in the cabin. The electric powerplant 10 includes an electric engine 12 drivingly coupled to a load, such a rotary airfoil device 14. In this example, the electric powerplant 10 is housed within a nose 16 of the aircraft and the rotary airfoil device 14 is provided in the form of a propeller 18, such as a variable-pitch propeller. In this example, the electric engine 12 has a first shaft which will be referred to here as a source shaft 40 and the rotary airfoil device 14 has an output shaft 42. The source shaft 40 and the output shaft 42 can form part of the drivetrain of the electric powerplant 10. In this example, the source shaft 40 is coupled to the output shaft 42 via a gearbox 44 having reduction gearing and acting here as a transmission. In one embodiment, the reduction gearing is an epicyclic gearing, and the source shaft 40 is rotatable around the same rotation axis 46 as the output shaft 42, in an in-line configuration. An alternate form of transmission may be used in an alternate embodiment. Moreover, the electric engine 12 also has a second shaft 48 coupled to an accessory gearbox (AGB) 50 mechanically coupled to mechanically-driven accessories. Numerous variants are possible in different applications. For instance, in embodiments of drivetrains which are not shown, the reduction gearing can have an offset configuration, with the source shaft and the output shaft parallel but offset rather than an in-line configuration. In an alternate embodiment, the electric engine may have a single source shaft and the mechanically-driven accessories can all be mechanically coupled to a unique gearbox. In an alternate embodiment, the rotary airfoil device 14 may be enclosed within a ducted structure in a fan configuration. Moreover, in the case of a helicopter application, the rotary airfoil device may include helicopter blades, and the output shaft may or may not be parallel to the source shaft.

Independently of the details of a given embodiment, bearing assemblies 20, such as ball bearings, may be used to provide smooth relative rotation between one or more of the shafts and non-rotating components such as a casing, and/or between two shafts which rotate at different speeds. A lubricant subsystem 22 including a lubricant pump 24, sometimes referred to as a main pump, and a network of conduits and nozzles 26, can be provided to feed the bearings 20 with a lubricant such as oil. Seals 28 can be used to contain the oil. A scavenge system 30 having cavities 32, conduits 34, and one or more scavenge pumps 36, can be used to recover the oil, which can be in the form of an oil foam at that stage, from the bearings 20. The oil pump 24 draws the oil from an oil reservoir 38. Air/oil separating devices (not shown) may be provided in the return line. Lubricant can also be supplied to lubricate gearing, such as a reduction gearbox 44 and/or accessory gearbox 50, in which case such gearboxes may be provided with a lubricant sump or with the oil reservoir. Lubricant may be used not only for lubrication, but also for heat management, namely in cooling components which generate heat during operation, such as gearing (e.g. reduction gearing).

Other types of engines may be used in aviation. For instance, aircraft hybrid powerplants comprising a combination of electric and heat engines or aircraft powerplants with a heat engine only are contemplated. There can be a motivation to retrofit an electric engine 12 to replace an existing, possibly ageing, heat engine in an aircraft. Either retrofitting an electric engine 12 to an existing aircraft, or designing an aircraft for receiving a new engine, may involve taking certain limitations into consideration. For example, in the example presented in FIG. 1, housing an engine 12 in an aircraft may be affected by engine installation constraints such as engine cowling of a narrow body shape (which may be tied to propeller thrust efficiency, pilot visibility, and aircraft performance-drag, for instance), the presence of a cabin firewall 52, or the propeller plane 54 axial position, which may impose particular limits in terms of dimensions or volume, in addition to other typical considerations in aviation such as cost (production and maintenance), weight, reliability, etc. In the case of retrofitting an electric engine 12 to a heat engine emplacement on an existing aircraft, additional challenges can exist in terms of finding ways to address other functionalities of the existing engine, such as driving accessories such as an oil pump 24, fuel-hydraulic actuators, heat exchangers, environmental control system, etc.

Figure 2:
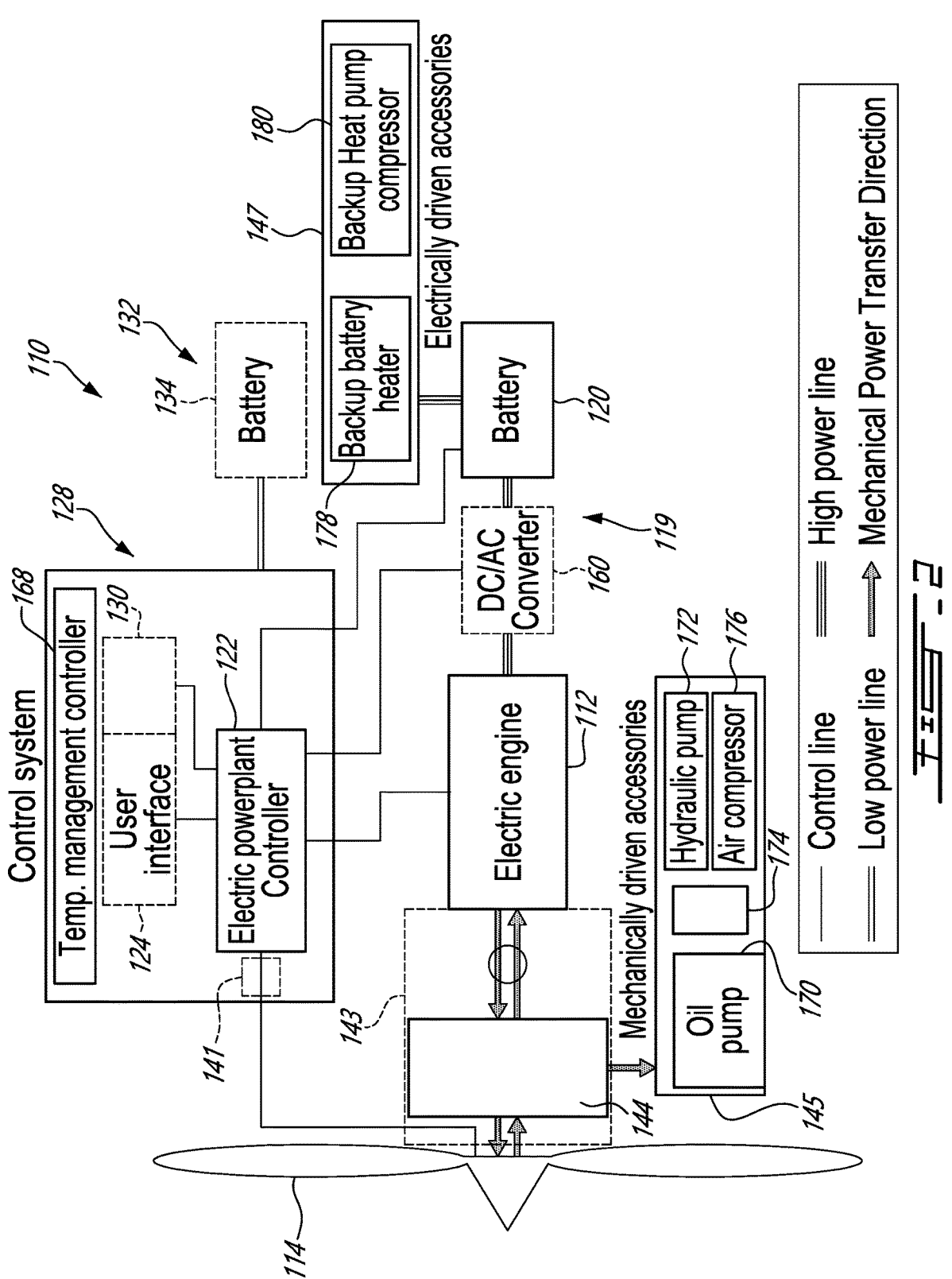
FIG. 2 is a schematic view of another example of an electric powerplant installation in an aircraft, presenting an example of a power and control scheme.

Turning now to FIG. 2, another example of an electric powerplant 110 is schematically presented. In this figure, emphasis is placed on the configuration of power transfer relationships and communication lines. At the mechanical level, an electric engine 112 is mechanically coupled to a rotary airfoil device 114. More specifically, the electric engine 112 can have a source shaft (not shown), the rotary airfoil device 114 can have an output shaft (not shown), and the source shaft can be coupled to the output shaft. A transmission 144 is provided in this example. In this example, the transmission 144, the source shaft and the output shaft can form a drivetrain 143 of the electric powerplant 110. The transmission 144 can include reduction gearing coupling the output shaft to the source shaft. In one embodiment, a torque transfer shaft (not shown) may couple the transmission 144 to the output shaft. The transmission 144 can be enclosed in a casing which also serves to contain lubricant, and can be provided in the form of a gearbox.

A first electric system 119 is provided with a first battery 120. The electric engine 112 can operate in an engine mode in which it can convert the electrical energy from the first battery 120 to mechanical energy over time, and can thus convert electrical power circulating in a transmission line extending between the first battery 120 and the electric engine 112 to mechanical power in the shafts, transmission 144, and rotary airfoil device 114, driving thrust. This process can generate heat. In one embodiment, the electric engine 112 can operate not only in an engine mode, but may also operate in generator mode. More specifically, in some situations, such as descent, the rotary airfoil device 114 may operate in windmilling rather than thrusting, and rather than imparting velocity to the surrounding air, operate in deriving energy from the relative velocity of the surrounding air. The windmilling can be driven by ram air. An intensity of the windmilling can be controlled by controlling the pitch of the blades and/or controlling a load. In this mode of operation, mechanical energy is conveyed, via rotation of the output shaft and of the source shaft, from the rotary airfoil device 114 to the electric engine 112, which can be operated in a way to convert this mechanical energy into electrical energy stored in the first battery 120.

A controller 122 can be provided to control the operation of the electric engine 112. This can involve controlling values of parameters of the electric engine 122 directly, and/or receiving values of parameters from sensors associated to the electric engine 112, and in this sense, the controller 122 can communicate with the electric engine 112. The control of the electric engine 112 can also involve controlling or receiving sensor inputs from other elements of the electric powerplant 110, such as the first battery 120 for instance. The control of the electric engine 112 can be based on further inputs, such as via communication with additional sensors (e.g. torque sensor, current sensor, shaft position sensor, temperature sensor—not shown) or a user interface 124 (e.g. thrust lever, aircraft control panel, etc.). The control of the electric engine 112 can involve controlling the power output (in engine mode) or the power input (in generator mode) of the electric engine 112. The control of the electric engine 112 can involve monitoring the operation of the electric powerplant 110 based on sensor input. The control of the electric engine 112 can involve determining whether a fault concerning one or more of the electric engine 112 and the first battery 120 is occurring during flight. The control of the electric engine 112 can involve mechanically decoupling the source shaft from the output shaft if the fault is detected.

In an embodiment where the rotary airfoil device 114 is a variable pitch propeller, the controller 122 may also control the pitch of blades of the rotary airfoil device. A more aggressive pitch is typically referred to as "coarse" and is more typically used at higher speed, whereas a less aggressive pitch may be referred to as "fine" and is more typically used at takeoff or low speed. A pitch at which the rotary airfoil device 114 may rotate while generating no significant net thrust while the aircraft is immobile may be referred to as "disking", in which the chord of the blades extend parallel to the propeller plane 54. Disking can be referred to as the finest pitch. A pitch referred to as feathering refers to bringing the chord of the blades close to parallel to the relative movement orientation of the ambient air, typically producing minimal drag in the event of a fault in the engine drivingly coupled to it. In one embodiment, a propeller control unit (PCU) 141 is provided which can mechanically control the pitch of blades of a rotary airfoil device 114 based on inputs from the controller 122. In some embodiments, a pitch sensor (not shown) can provide the controller 122 with a measurement of the pitch of the blades, and can be used by the controller 122. Various factors may guide the control of the pitch of the blades. For instance, the relative velocity between the ambient air and the aircraft, and the speed of rotation of the blades, may both affect which pitch angle will lead to the greatest amount of thrust. Moreover, in some situations, such as during descent, it may be desired to extract energy from the relative velocity of the surrounding air rather than impart energy for thrust. The amount of energy so extracted may also be affected by the pitch, in addition to control parameters of the electric engine for instance.

The controller 122, which can be referred to as the electric powerplant controller, can form part of a control system 128. The control system 128 may further include electric accessories 130, such as a navigation subsystem (not shown), or a maneuvering subsystem (not shown), and may include other controllers, such as a temperature management controller 168. Depending on the embodiment, different controllers can be embodied as distinct controller units, or different software modules running on a same computer, for instance. The navigation subsystem can include sensors and user interface elements associated to the sensing and displaying of navigation parameters such as longitude, latitude, altitude. The maneuvering subsystem can include sensors and/or user interface elements associated to the maneuvering of the aircraft, such as control elements associated to the thrust, roll, yaw and/or pitch of the aircraft. A second electrical system 132 may be used to power elements of the control system 128 such as the controller 122. The second electrical system 132 can include a second battery 134. The second electrical system 132 may operate at low voltage, such as at or below 120V.

In an embodiment, the first electric system 119 can operate at high voltage, such as at or above 220V. The first battery 120 can be a high voltage battery. The electric engine 112 may be an AC electric engine and the first battery 120 can be a DC battery, in which case an AC/DC converter 160 may be used as part of the first electric system 119, between the first battery 120 and the electric engine 112. The first battery may require temperature control such as heating and/or cooling, depending on the embodiment and depending on operating conditions. For instance, components of the first electric system 119 such as one or more of the electric engine 112, the AC/DC converter 160 and the first battery 120 may generate heat when the electric engine 112 is operated in engine mode to deliver thrust via the drivetrain 143 and the rotary airfoil device 114, and it may be desired to provide means to cool one or more of these components. In one embodiment, a coolant subsystem (not shown) can be used to cool one or more of these components. In another embodiment, a lubricant subsystem (not shown) can be used to cool one or more of these components. The controller 122 may also generate heat during operation, and it may be desired to provide a subsystem which can cool the controller 122. In one embodiment, a coolant subsystem can be used to cool the controller 122. In another embodiment, a lubricant subsystem can be used to cool the controller 122. Coolant, sometimes alternately referred to as antifreeze, can have a higher thermal capacity than oil, but oil or another lubricant may also be used as a coolant in some embodiments. Glycol or type II oil may be used as a coolant for instance. Lubricants can have a thermal capacity between 1500 J kg⁻1 K and 2000 J kg$^{-1}$ K, for instance, whereas coolants may have a thermal capacity above 2500 J kg$^{-1}$ K, and even above 3500 J kg$^{-1}$ K. Using a coolant which has a high thermal capacity may allow to reduce the volume and/or weight of heat exchangers associated with the coolant subsystem. Heat may need to be extracted from a coolant subsystem during operation, and a heat pump may be used to this end. A heat pump may include a refrigerant circuit fluidly connecting, in sequence, a compressor, a condenser, an expansion valve, and an evaporator, with the evaporator in heat exchange contact with the coolant circuit. While a coolant and a lubricant are typically not optimized for phase changing during the cooling process, a refrigerant is typically optimized for phase changing during the cooling process, passing from gaseous at the outlet of the evaporator to liquid at the outlet of the condenser, in accordance with a thermodynamic refrigeration cycle. Hydrofluorocarbons, hydrocarbon, hydrofluoroolefin are used in refrigerants, for instance, and propane, isobutene and ammonia are three examples of low climate impact refrigerants.

In one or more embodiments, mechanically-powered accessories 145 drivingly coupled to the drivetrain 143. For instance, mechanically-powered accessories 145 may have rotary shafts meshed with gears into gearing of the transmission 144. For instance, shafts may be provided with bevel gears which are coupled to a bevel gear of the output shaft in the transmission 144. In an alternate embodiment, the transmission 144 can include a plurality gears associated to parallel shafts to which different mechanically-powered accessories are coupled. Mechanically-powered accessories 145 may include a propeller control unit 141. Mechanically-powered accessories 145 may include a pump of a lubricant subsystem, such as an oil pump 170. The oil pump 170 may have the function of supplying pressure to oil which is circulated to lubricate and/or cool elements such as gearing and bearing assemblies, and/or to drive the operation of hydraulic actuators. Mechanically-powered accessories 145 may include a coolant pump 172 which can be used to drive the circulation of coolant in a coolant circuit of a coolant subsystem, for instance, and/or another hydraulic pump. Mechanically-powered accessories 145 can include a compressor 174 of a heat pump. Such accessories can include an air compressor 176 which may be used to pressurize air into a pressurized air network which may be used to deliver pressurized air to a cabin 11 and/or to pneumatic devices of the aircraft, for instance.

In one or more embodiments, electrically-powered accessories 130, 147 may also be provided and powered by either one of the first electric system 119 or the second electric system 132 depending on the embodiment, such as a backup battery heater 178 and/or a backup heat pump compressor 180.

Figure 3:
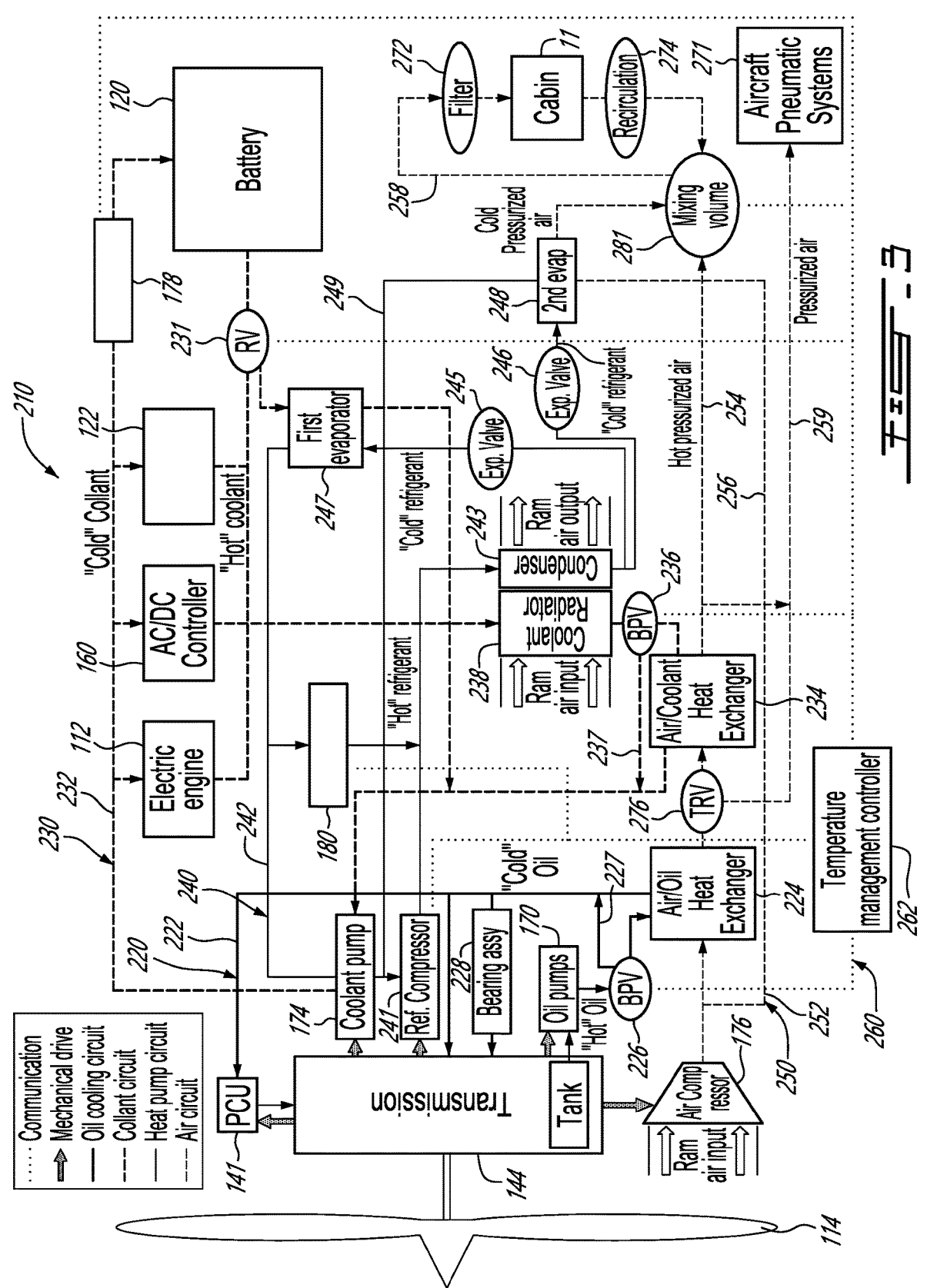
FIG. 3 is a schematic view of another example of an electric powerplant installation in an aircraft, presenting an example of a temperature management scheme.

Turning now to FIG. 3, another example of an electric powerplant 210 is schematically presented. In this figure, emphasis is placed on the configuration of mechanical power transfer relationships and fluid circulation lines. More specifically, in an example embodiment five subsystems are schematically presented: a lubricant subsystem 220 having a lubricant circuit 222, a coolant subsystem 230 having a coolant circuit 232, a heat pump subsystem 240 having a refrigerant circuit 242, a pressurized air subsystem 250 having a network of pressurized air lines 252, and a control subsystem 260 having a temperature management controller 262 and communication lines. The subsystems interact with one another in different ways. While it will be understood that various alternate embodiments are possible, each one of these four subsystems will now be discussed in detail in the context of an example embodiment, beginning with the pressurized air subsystem 250.

In the illustrated embodiment, the pressurized air subsystem 250 has a plurality of lines, including two lines 254, 256 which can be used as part of an environmental control subsystem 60, to deliver pressurized, temperature-conditioned air to the cabin 11, and a third line 259 which can be used to deliver pressurized air to aircraft pneumatic systems. The number of lines can vary in alternate embodiments, and an alternate embodiment may have, for instance, only a single line leading to the cabin 11. The pressurized air subsystem 250 is operable to deliver pressurized air from a pressurized air source to the cabin. In this embodiment, the pressurized air source is a dedicated air compressor 176 which is exposed to ram air from the atmosphere. The air compressor 176 can be powered via the transmission 144, for instance (see FIG. 2). In an alternate embodiment, the pressurized air source may be air compressed directly by the rotary airfoil device 114, for instance.

In one embodiment, the pressurized air subsystem 250 can have a pressurized air line 254 operable to deliver pressurized air from the pressurized air source to the cabin, and the pressurized air line 254 can be in heat exchange relationship with a source of heat, and thus be referred to as a hot line. "Being connected in heat exchange relationship" can involve a heat exchanger which thermally exposes different fluids at different temperatures to one another, in a manner for the hotter fluid to heat the cooler fluid, thereby cooling the hotter fluid and heating the cooler fluid, while partitioning the fluids from one another and preventing them from mixing. Various heat exchanger technologies may be used and the choice is left to the designer. There can be other ways of connecting fluids, conduits or circuits in a heat exchange relationship than using a heat exchanger, and while they may be less efficient than some heat exchanger technologies, they may still be suitable in some embodiments. Using a source of heat to warm the pressurized air can be particularly useful at high altitudes, where the temperature is typically low, and also when the aircraft is on the ground in cold weather conditions.

Different sources of heat may be available on an electric powerplant, some of which may be more suitable than others. However, it will be noted that contrary to a heat engine powerplant, where a significant amount of heat may be generated as a by product of the combustion process, sources of heat may not be as readily available on an electric powerplant, though some may nonetheless be available.

In one example, rotary elements of the electric drivetrain, such as the transmission 144, may generate heat due to frictional losses when the electric engine 112 is operating in engine mode and/or in generator mode. This heat may be collected by the lubricant which is used to lubricate the transmission 144, and may be harnessed as a source of heat to heat the pressurized air in the pressurized air line 254. In the example presented in FIG. 3, this heat exchange relationship between the pressurized air line 254 and the lubricant circuit 222 is provided by way of an air/oil heat exchanger 224. Depending on the embodiment, the lubricant may also collect heat from other components, such as bearing assemblies 228 and/or a propeller control unit 141 for instance. In an embodiment, the flow rate of the lubricant circulating in the air/oil heat exchanger 224 can be modulated by controlling a bypass valve 226, which may be controlled to selectively convey some, or all of the oil in a lubricant bypass line 227 configured in parallel to the air/oil heat exchanger 224. In one embodiment, the bypass valve 226 can be controlled by the temperature management controller 262 to direct all the oil through the bypass line 227 when starting the engine in cold weather, for instance, and to direct all the oil through the air/oil heat exchanger 224 when cruising. In an embodiment, the lubrication subsystem 220 can be the only source of heat in heat exchange relationship with the pressurized air line 254, whereas in other embodiments, it can be combined with one or more other sources of heat.

In another example, one or more components of the first electric system 119, such as the first battery 120 and/or an AC/DC converter 160, may generate heat during operation when the electric engine 112 is operating in engine mode and/or in generator mode. Such heat may be collected by a coolant which can be circulated in a coolant circuit 232, and may be harnessed as a source of heat to heat the pressurized air in the pressurized air line 254. In the example presented in FIG. 3, this heat exchange relationship between the pressurized air line 254 and the coolant circuit 232 is provided by way of an air/coolant heat exchanger 234. Depending on the embodiment, the coolant may also collect heat from other components, such as a electric powerplant controller 122, and/or the electric engine 112 itself, for example. In an embodiment, the amount of heat transferred from the coolant to the pressurized air line 254 can be modulated by controlling a bypass valve 236, which may be controlled to selectively convey some, or all of the coolant in a coolant bypass line 237 configured in parallel to the air/coolant heat exchanger 224. In an embodiment, the coolant subsystem 230 can be the only source of heat in heat exchange relationship with the pressurized air line 254, whereas in other embodiments, it can be combined with one or more other sources of heat. In one embodiment, temperature control processes may be controlled by a controller or controller functions which may be referred to as a temperature management controller 262, and the temperature management controller 262 may control the lubricant subsystem 220 and the coolant subsystem 230 in a manner to selectively use either one, or both, as a heat source for the pressurized air line 254 depending on operating conditions monitored by sensors or on user inputs, and based on instructions. For instance, the coolant subsystem 230 may represent a more constant source of heat, while the lubricant subsystem 220 may represent a source of heat only in certain conditions of operation, and the temperature management controller 262 may modulate the amount of heat transferred into the pressurized air line 254 based not only on the amount of heat available in the subsystem(s), but further based on the amount of heat demanded for temperature control in the cabin 11, such as based on a given cabin temperature set point and/or on a difference between the cabin temperature and the cabin temperature set point.

It will be noted here that in the example presented in FIG. 3, the coolant subsystem 230 is provided with a coolant radiator 238 via which heat collected by the coolant can be evacuated to the atmosphere. In the specific example presented in FIG. 3, the coolant radiator 238 is exposed to ram air having a velocity which varies as a function of airspeed, and while the ram air may be sufficient to satisfy the heat evacuation needs during flight, the ram air may not be sufficient to satisfy the heat evacuation needs when the aircraft is grounded in hot weather. Moreover, the need for heating cabin air may be low or inexistent in warm weather, and evacuating the heat collected by the coolant via the air/coolant heat exchanger 234 may not be suitable in some operating conditions, such as when the aircraft is grounded in hot weather. In some embodiments, it may be preferred to use an air compressor to force air through a coolant radiator or through a condenser 243 in certain operating conditions.

In some embodiments, a heat pump subsystem 240 may be needed to cool one or more of the components of the electric powerplant 210 in some conditions of operation. In the embodiment presented in FIG. 3 for example, a heat pump is used to cool the coolant in some conditions of operation, such as when the aircraft is on the ground in hot weather. The heat pump includes a refrigerant circuit 242 connecting, in sequence, a compressor 241, a condenser 243, an expansion valve 245, and a first evaporator 247. In the embodiment of FIG. 3, the first evaporator 247 is connected in heat exchange relationship with the coolant circuit 232, and can be alternately referred to as, or include, a coolant/refrigerant heat exchanger. It will be noted here that in the example presented in FIG. 3, the condenser 243, which is a source of heat, is provided in the form of a refrigerant radiator via which heat collected by the refrigerant can be evacuated to the atmosphere. In the specific example presented in FIG. 3, the refrigerant radiator is exposed to ram air, but in an alternate embodiment, the refrigerant radiator may be exposed to forced air flow for instance. The possibility of providing the refrigerant radiator in series or in parallel with a coolant radiator are two possible design choices. In an embodiment, heat collected by the refrigerant may instead be used as a source of heat to heat the pressurized air in the pressurized air line, for instance.

In the embodiment presented in FIG. 3, it will be noted that a valve 231 referred to herein as a regulation valve which can be controlled, such as by a temperature management controller 262, to direct coolant flow through the first evaporator 247 or through the coolant radiator 238, or both, such as in variable or fixed proportions. Accordingly, the regulation valve 231 may direct more or all coolant through the first evaporator 247 when the heat pump subsystem 240 is in operation, or may direct more or all coolant through the coolant radiator 238 when considered suitable, such as when the ram air input is deemed sufficient to satisfy the cooling needs. Operating the heat pump subsystem 240 may be more convenient when the aircraft is on the ground and when the heat pump subsystem 240 can be powered by an external power source, which is also an operating condition where ram air may not be available and where cooling capacity via the coolant radiator 238 may be limited. In one embodiment, the regulation valve 231 can be a tri-way regulated valve located before the 2 coolers to modulate the flow supply to each cooler depending on operating mode and outside temperature.

A pressurized air line 254 which is connected in heat exchange relationship with a source of heat such as the coolant circuit 232, the lubricant circuit 222, or both, can be referred to as a "hot" line. In the embodiment presented in FIG. 3, the pressurized air subsystem has a network of pressurized air lines including not only a hot line, but also a "cold" pressurized air line 256 having a heat sink via which the pressurized air may be cooled rather than heated. Depending on the embodiment, a pressurized air subsystem 260 may be provided with only a hot line, only a cold line, or with both a hot line and a cold line. In an embodiment where the pressurized air subsystem 260 has both a hot line and a cold line, pressurized air from the hot line and the cold line may be mixed upstream of the cabin 11 to achieve a desired temperature of air delivered at the cabin. More specifically, a flow rate of pressurized air from the hot pressurized air line 254 and from the cold pressurized air line 256 can combine in a portion of the pressurized air network 252 which will be referred to herein as the mixing volume. The mixing volume can be a portion of the pressurized air network 252 which can be configured in a manner to favor mixing of different sources of pressurized air. For instance, in one embodiment, a dedicated mixing chamber may be used as a mixing volume. In another embodiment, the mixing volume may be implemented in the form of a portion or an entirety or a delivery line 258 leading to the cabin 11, which may or may not have a larger cross-section than an eventual remainder of a delivery line 258 leading to the cabin 11.

More specifically, an air temperature may be requested at a temperature management controller 262, the temperature management controller 262 may receive sensor inputs indicating a temperature of the pressurized air in the hot pressurized air line 254, and a temperature of the pressurized air in the cold pressurized air line 256, and a hot line valve and a cold line valve (not shown) may be controlled by the temperature management controller 262, respectively, to control the flow rate of pressurized air from the hot line and from the cold line, in a manner to achieve the requested air temperature in a delivery line 258 connecting the cabin 11. In an alternate embodiment, both "cold" and "hot" pressurized air lines 254, 256 can be connected to a temperature regulated valve 276 which controls the mixing proportions of cold and hot air coming from both lines to supply the desired air temperature to the aircraft cabin 11. A regulated air pressure valve is not shown but could be added before and after the thermal regulated valve 276 to control the air pressure deliver to the cabin 11. Also, a pressure regulated valve 276 is not shown but could be added before the pneumatic system 271. Excess pressurized air from those valves could be return upstream of the circuit, or, in an alternate embodiment, a scavenge line may be used.

One way of cooling a (cold) pressurized air line 256 is to use a heat pump subsystem 240. More specifically, the heat pump subsystem 240 can have a refrigerant circuit fluidly connecting, in sequence a compressor 241, a condenser 243, an expansion valve 246, and an evaporator 248, and the line of pressurized air can be connected in heat exchange relationship with the evaporator 248. In an embodiment having both a hot pressurized air line 254 and a cold pressurized air line 256, the cold pressurized air line 256 may branch off from the hot line downstream of the pressurized air source 176, for instance, allowing to share the pressurized air source amongst both lines, or separate pressurized air sources may be used, depending on the embodiment.

In the specific embodiment presented in FIG. 3, it will be noted that a single heat pump subsystem 240 is provided with two evaporators 247, 248. More specifically, the heat pump has a refrigerant circuit fluidly connecting, in sequence, the compressor 241, the condenser 243, the expansion valve 245, and the first evaporator 247, and a separate line, which will be referred to herein as an environmental control line, 249 branches off from the refrigerant circuit 242 between the condenser 243 and the first evaporator 245, and reconnects the refrigerant circuit 242 upstream of the compressor 241. The environmental control line 249 has the second evaporator 248. The first evaporator 247 is connected in heat exchange relationship with the coolant circuit 232, whereas the second evaporator 248 is connected in heat exchange relationship with the pressurized air subsystem 250, and more specifically the cold pressurized air line 256. Depending on the embodiment, a single expansion valve may be used downstream of the condenser 243, after which the environmental control line 249 may branch off, or the environmental control line 249 may branch off upstream of the expansion valve 245, and expansion valves 245, 246 may be provided in each one of the two lines downstream of the branching point. Depending on the embodiment, heat pump subsystem 240, such as via design of the lines branching off downstream of the condenser 243, can be designed to direct a given proportion of the refrigerant flow rate through the first evaporator 247 and to direct a given proportion of the refrigerant flow rate through the second evaporator 248, and the proportions can be set at the design stage as a function of the expected needs throughout the operating envelope.

Depending on the embodiment, the pressurized air network 252 can also include a pressurized air line 259 connecting aircraft pneumatic systems 271. Moreover, it will be noted that the delivery line 258 can have an air filter 272, and a recirculation fan 274, and associated lines, may be provided to recycle the pressurized cabin air into the pressurized air network 252.

It will be noted that in the illustrated example, the coolant pump 174, the oil pump 170, the compressor 241 and the air compressor 176 can be mechanically driven, such as by being mechanically coupled to the electric drivetrain (e.g. via transmission 144). In another embodiment, such components may be electrically powered, such as powered by battery 120. In the illustrated embodiment, a backup is provided to the compressor 241, and the backup is provided here in the form of a backup heat pump compressor 180. The backup heat pump compressor 180 can be electrically powered. An electric heater 178 is also provided to heat the coolant as a means of heating the battery in cold weather conditions. The electric heater 178 and the backup heat pump compressor 180 can be controlled by the temperature management controller 262.

The temperature of the battery may need to be controlled, e.g. maintained within a certain, limited, temperature range, even when the aircraft is not in operation to avoid problems in durability, capacity, reliability, and safety (avoid risk of overheat, material degradation and fire ignition) thru the product lifecycle. The electric heater 178 and the heat pump subsystem 240 may be controlled to this end, e.g. via the temperature management controller 262. The backup heat pump compressor 180 can be controlled to operate in a manner to cool the battery when cooling is deemed useful and when the electric engine 112 is not in operation. An alternative to the use of an electric heater 178 is to use a condenser, such as condenser 243, as a means of heating the coolant when heating of the battery is deemed useful.

Figure 4:
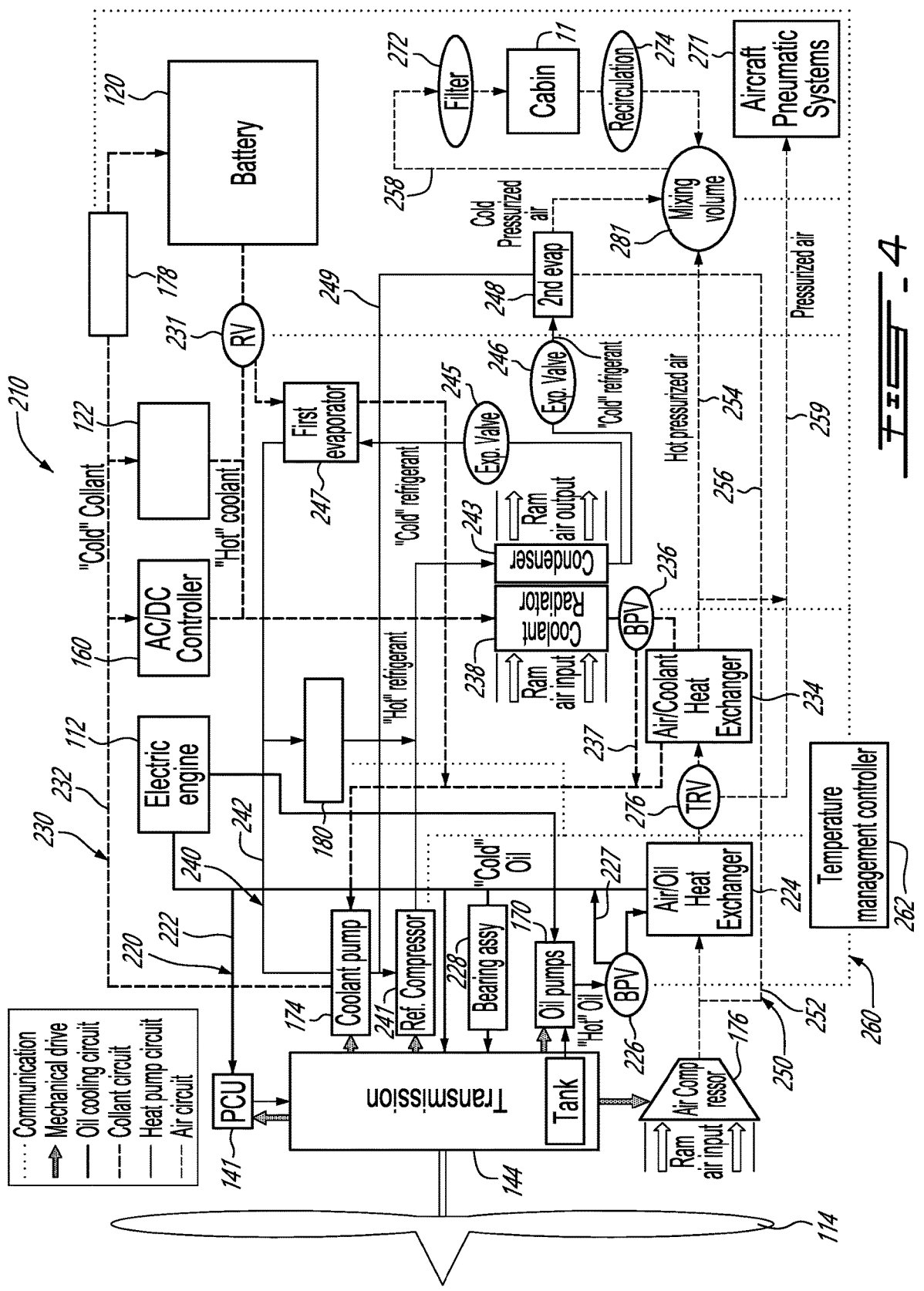
FIG. 4 is a schematic view of another example of an electric powerplant installation in an aircraft, presenting another example of a temperature management scheme.

Turning now to FIG. 4, another embodiment is presented. In this embodiment, the lubrication subsystem which is configured to not only lubricate but cool the transmission geartrain is also used to cool the electric motor/generator. In such an embodiment, it can be preferred to use a same type of coolant for cooling both the transmission geartrain and the electric motor, which may be selected in a manner to avoid premature deterioration of electric insulator. In a context where this may limit the type of coolant to be used compared to the embodiment presented in FIG. 3, the embodiment presented in FIG. 3 may be preferred in some embodiments. It will be noted that in yet another embodiment, the use of a separate coolant circuit may be omitted altogether, and the lubricant circuit may have a network of lines directing coolant to all the components which need to be actively cooled with a liquid, such as the electric motor, battery, AC/DC converter, electric powerplant controller, etc.

Figure 5:
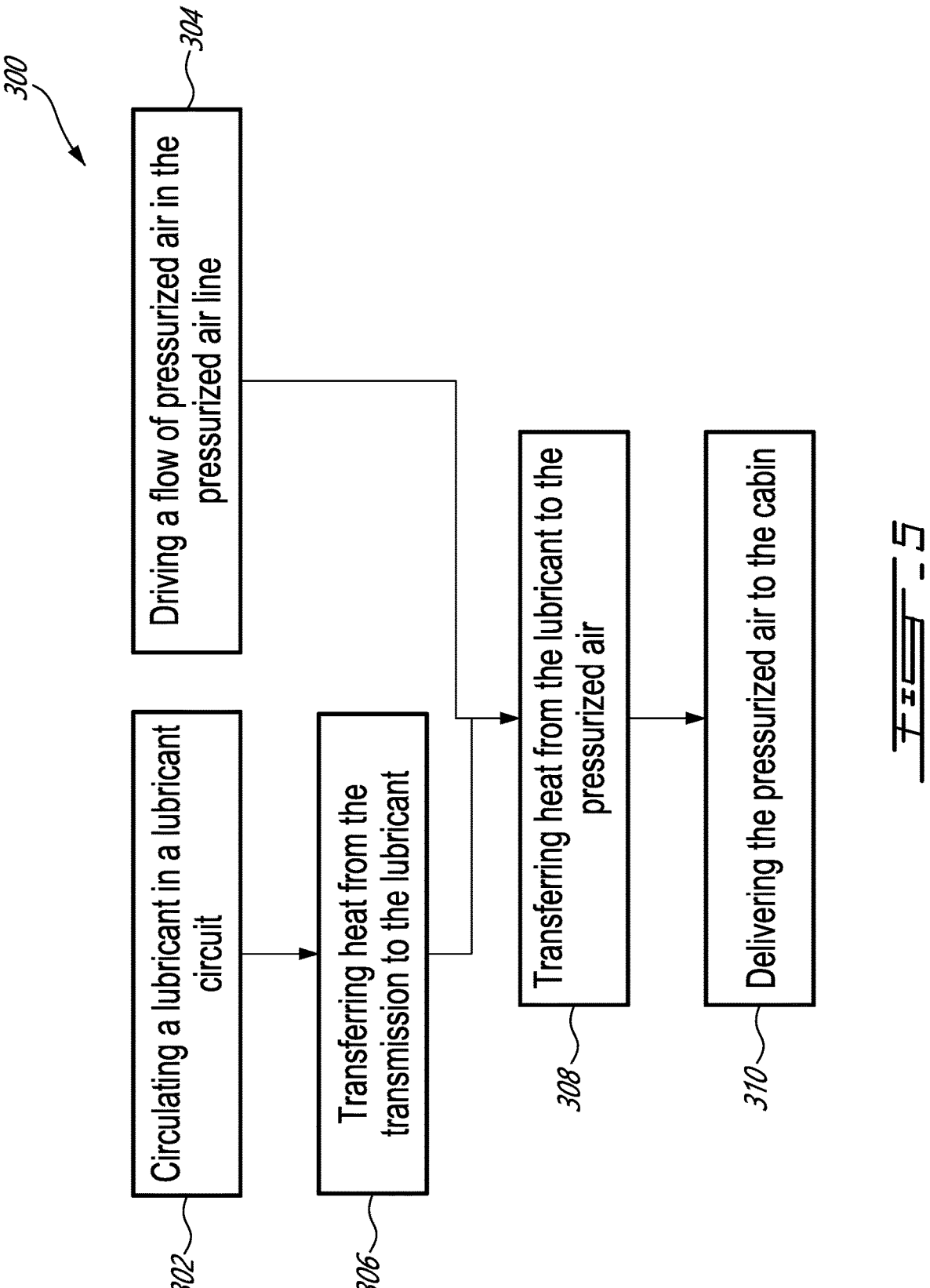
FIG. 5 is a flow chart of an example method of conditioning cabin air of an aircraft having an electric powerplant.

Accordingly, as presented in FIG. 5, in accordance with one embodiment, there is provided a method 300 of conditioning cabin air of an aircraft 10 having a cabin 11, a pressurized air line 254 fluidly connecting the cabin 11, and an electric engine 112 powered by a battery 120, the electric engine 112 drivingly coupled to a rotary airfoil device 114 by a transmission 114. The method 300 can include: circulating 302 a lubricant in a lubricant circuit 222; driving 304 a flow of pressurized air in the pressurized air line 254; transferring 306 heat from the transmission 144 to the lubricant; transferring 308 heat from the lubricant to the pressurized air; and delivering 310 the pressurized air to the cabin 11 subsequently to said transferring heat from the lubricant.

Figure 6:
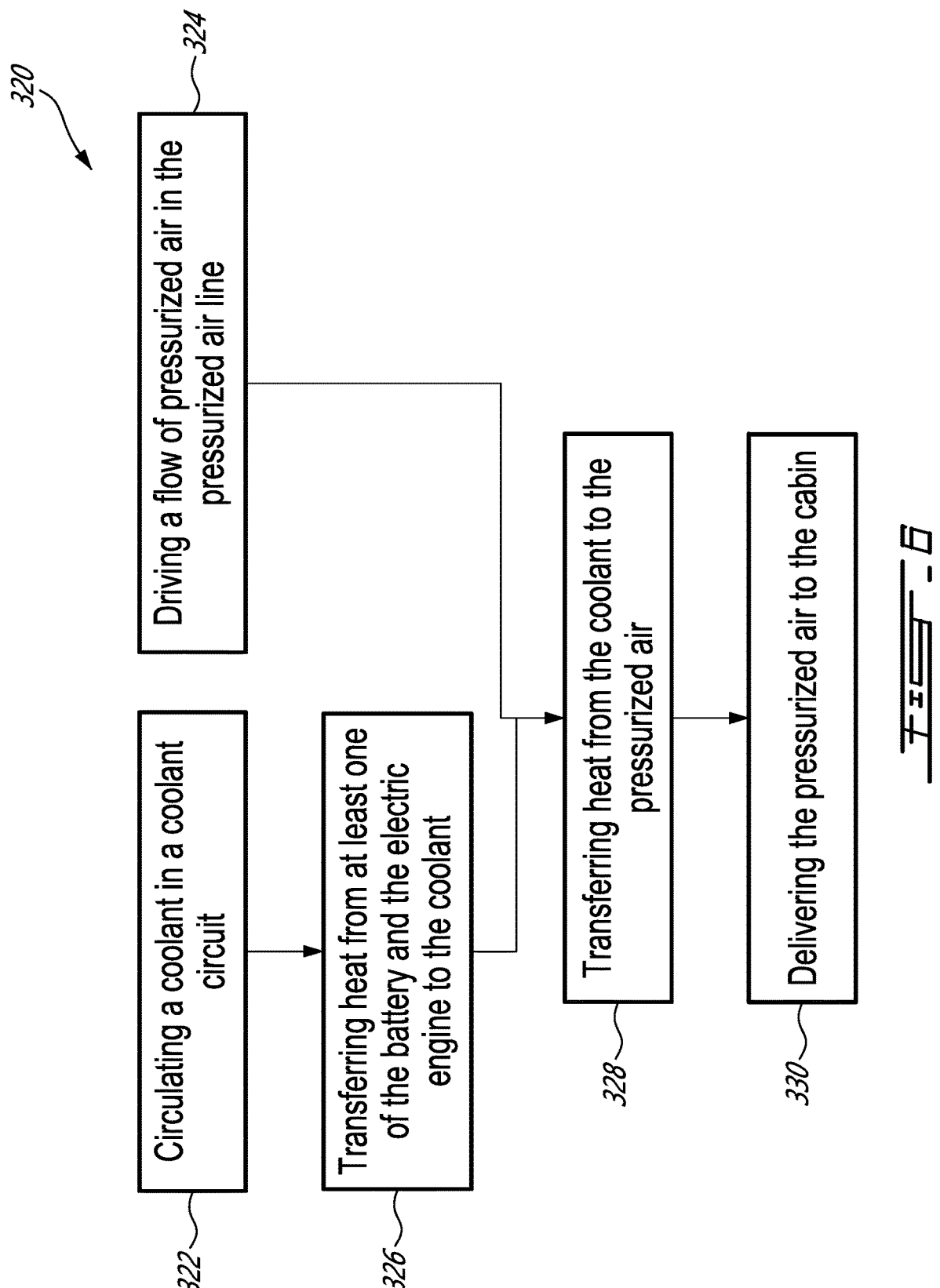
FIG. 6 is a flow chart of another example method of conditioning cabin air of an aircraft having an electric powerplant.

In accordance with another embodiment, as presented in FIG. 6, there is provided a method 320 of conditioning cabin air of an aircraft 10 having a cabin 11, a pressurized air line 254 fluidly connecting the cabin 11, and an electric engine 112 powered by a battery 120, the electric engine 112 drivingly coupled to a rotary airfoil device 114. The method 320 can include: circulating 322 a coolant in a coolant circuit 232; driving 324 a flow of pressurized air in the pressurized air line 254; transferring 326 heat from at least one of the battery 120 and the electric engine 112 to the coolant; and transferring 328 heat from the coolant to the pressurized air; and delivering 330 the pressurized air to the cabin subsequently to said transferring 328 heat from the coolant.

Figure 7:
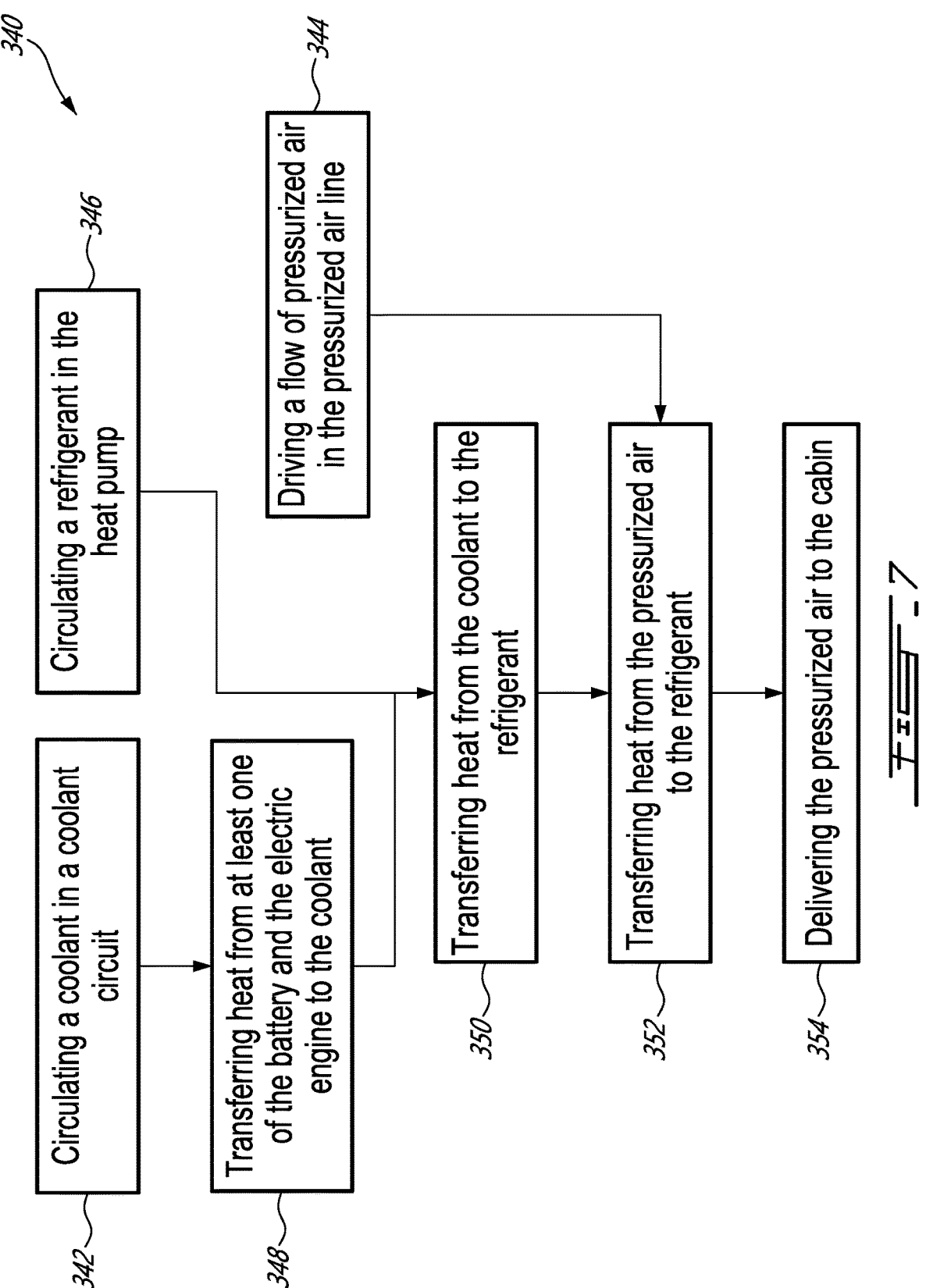
FIG. 7 is a flow chart of another example method of conditioning cabin air of an aircraft having an electric powerplant.

In accordance with another embodiment, as presented in FIG. 7, there is provided a method 340 of conditioning cabin air of an aircraft 10 having a cabin 11, a pressurized air line 256 fluidly connecting the cabin 11, an electric engine 112 powered by a battery 120, the electric engine 112 drivingly coupled to a rotary airfoil device 114, and a heat pump 240. The method 340 can include: circulating 342 a coolant in a coolant circuit 232; driving 344 a flow of pressurized air in the pressurized air line 256; circulating 346 a refrigerant in the heat pump 240; transferring 348 heat from at least one of the electric engine 112 and the battery 120 to the coolant; transferring 350 heat from the coolant to the refrigerant; transferring 352 heat from the pressurized air to the refrigerant; and delivering 354 the pressurized air to the cabin 11 subsequently to said transferring 352 heat from the pressurized air.

Figure 8:
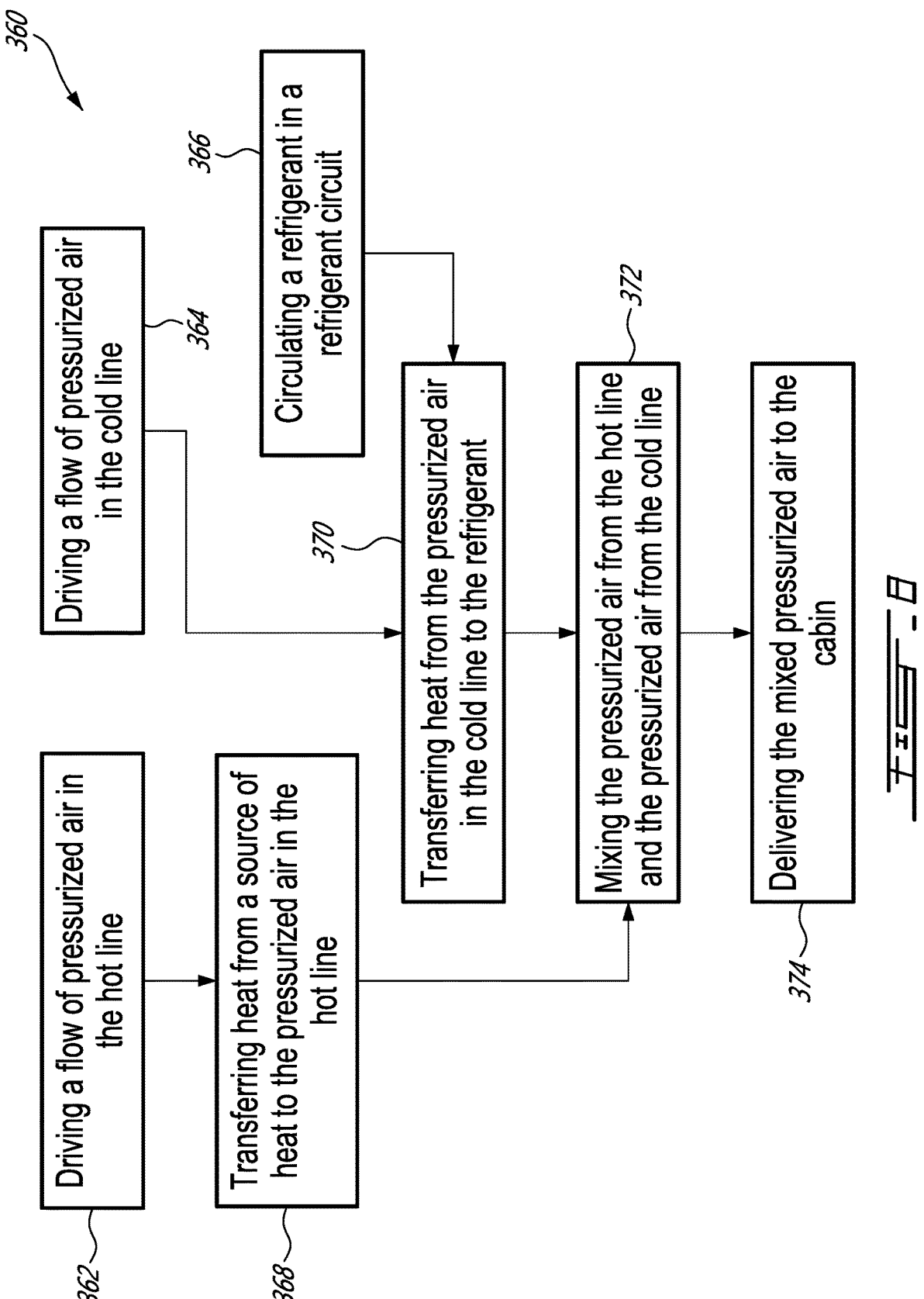
FIG. 8 is a flow chart of another example method of conditioning cabin air of an aircraft having an electric powerplant.

In accordance with another embodiment, as presented in FIG. 8, there is provided a method 360 of conditioning cabin air of an aircraft 10 having a cabin 11, a network of pressurized air lines 252 fluidly connecting the cabin 11 and including a hot pressurized air line 254 and a cold pressurized air line 256, and an electric engine 112 drivingly coupled to a rotary airfoil device 114. The method 360 can include: driving 362 a flow of pressurized air in the hot pressurized air line 254; driving 364 a flow of pressurized air in the cold pressurized air line 256; circulating 366 a refrigerant in a refrigerant circuit 242; transferring 368 heat from a source of heat to the pressurized air in the hot pressurized air line 254; transferring 370 heat from the pressurized air in the cold pressurized air line 256 to the refrigerant; mixing 372 the pressurized air from the hot line and the pressurized air from the cold line downstream of the transferring 368 heat from the source of heat and of the transferring 370 heat from the pressurized air, respectively; and delivering 374 the mixed pressurized air to the cabin 11.

It will be understood that the expression controller as used herein is not to be interpreted in a limiting manner. It is rather used in a broad sense to generally refer to the combination of some form of one or more processing units and some form of memory system accessible by the processing unit(s). The memory system can be of the non-transitory type. The use of the expression controller in its singular form as used herein includes within its scope one or more processing units working to perform a given function, or one or more processing units working to perform different functions.

A processing unit can be embodied in the form of a general-purpose micro-processor or microcontroller, a digital signal processing (DSP) processor, an integrated circuit, a field programmable gate array (FPGA), a reconfigurable processor, a programmable read-only memory (PROM), an electronic engine controller EEC, a full authority digital engine controller (FADEC), to name a few examples.

The memory system can include a suitable combination of any suitable type of computer-readable memory located either internally, externally, and accessible by the processor in a wired or wireless manner, either directly or over a network such as the Internet. A computer-readable memory can be embodied in the form of random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) to name a few examples.

It will be understood that a controller can perform functions or processes via hardware or a combination of both hardware and software. For example, hardware can include logic gates included as part of a silicon chip of a processor. Software (e.g. application, process) can be in the form of data such as computer-readable instructions stored in a non-transitory computer-readable memory accessible by one or more processing units. With respect to a controller or a processing unit, the expression "configured to" relates to the presence of hardware or a combination of hardware and software which is operable to perform the associated functions.

The methods and systems for operating an electric powerplant described herein may be implemented in a high level procedural or object oriented programming or scripting language, or a combination thereof, to communicate with or assist in the operation of a computer system, for example the controller. Alternatively, the methods and systems for operating an electric powerplant may be implemented in assembly or machine language. The language may be a compiled or interpreted language. Program code for implementing the methods and systems for operating an electric powerplant may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating an electric powerplant may also be considered to be implemented by way of a non-transitory computer-readable storage medium having a computer program stored thereon. The computer program may comprise computer-readable instructions which cause a controller, or more specifically a processing unit, to operate in a specific and predefined manner to perform the functions described herein, for example those described in methods 300, 320, 340 and 360.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For instance, in an alternate embodiment, the heat pump can be connected in heat exchange relationship with a lubricant circuit rather than being connected in heat exchange relationship with a coolant circuit. Yet further modifications could be implemented by a person of ordinary skill in the art in view of the present disclosure, which modifications would be within the scope of the present technology.

The invention claimed is:

1. An aircraft comprising:
   a cabin adapted to receive one or more persons;
   a rotary airfoil device;
   an electric engine drivingly coupled to the rotary airfoil device;
   a battery powering the electric engine;
   a coolant subsystem having a coolant circuit and a coolant pump operable to circulate a coolant in the coolant circuit, the coolant circuit connected in heat exchange relationship with at least one of the electric engine and the battery;
   a heat pump having a refrigerant circuit fluidly connecting, in sequence, a compressor, a condenser, an expansion valve, a first evaporator, and an environmental control line branching off from the refrigerant circuit between the condenser and the first evaporator, the environmental control line having a second evaporator and reconnected to the refrigerant circuit between the first evaporator and the compressor, the first evaporator connected in heat exchange relationship with the coolant circuit; and
   a pressurized air subsystem having a pressurized air line operable to deliver pressurized air from a pressurized air source to the cabin, the pressurized air line connected in heat exchange relationship with the second evaporator.

2. The aircraft of claim 1 wherein the coolant subsystem further comprises a coolant to air heat exchanger, the coolant to air heat exchanger being in parallel with the first evaporator.

3. The aircraft of claim 2 wherein the coolant subsystem has a valve operable to control a relative flow rate of coolant between the evaporator and the coolant to air heat exchanger.

4. The aircraft of claim 3 further comprising a controller operable to monitor operating conditions and to control the valve based on the operating conditions.

5. The aircraft of claim 1 wherein the compressor is powered by an external electrical power source.

6. The aircraft of claim 1 further comprising a transmission drivingly coupling the electric engine to the rotary airfoil device, wherein the compressor mechanically coupled to the transmission.

7. The aircraft of claim 1 wherein the compressor powered by the electric engine, further comprising an auxiliary compressor powered by an external electrical power source.

8. The aircraft of claim 1 wherein the condenser is connected to a ram air inlet.

9. The aircraft of claim 1 wherein the pressurized air line is a cold line, the pressurized air subsystem further comprising a hot line operable to deliver pressurized air from the pressurized air source to the cabin, the hot line connected in heat exchange relationship with a source of heat.

10. The aircraft of claim 9 wherein the source of heat is a lubricant circuit.

11. The aircraft of claim 9 wherein the source of heat is a coolant circuit.

12. The aircraft of claim 9 wherein the source of heat is the condenser.

13. The aircraft of claim 9 further comprising a mixing volume and a delivery line connecting the mixing volume to the cabin, the hot line and the cold line fluidly connected to the mixing volume.

14. A method of conditioning cabin air of an aircraft having a cabin, a pressurized air line fluidly connecting the cabin, an electric engine powered by a battery, the electric engine drivingly coupled to a rotary airfoil device, and a heat pump, the method comprising:

circulating a coolant in a coolant circuit;

driving a flow of pressurized air in the pressurized air line;

circulating a refrigerant in the heat pump;

transferring heat from at least one of the electric engine and the battery to the coolant;

transferring heat from the coolant to the refrigerant;

transferring heat from the pressurized air to the refrigerant; and delivering the pressurized air to the cabin subsequently to said transferring heat from the pressurized air.

15. The method of claim 14, further comprising determining whether the electric engine is in operation or not in operation.

16. The method of claim 15 further comprising performing said circulating the refrigerant, transferring heat from the coolant, and said transferring heat from the pressurized air contingent upon determining that the electric engine is not in operation.

17. The method of claim 15 further comprising transferring heat from the coolant to ram air when the electric engine is in operation.

18. The method of claim 14 wherein the pressurized air line is a first pressurized air line, further comprising transferring heat from the refrigerant to a second pressurized air line parallel to the first pressurized air line.

19. The method of claim 18 further comprising mixing pressurized air from the first pressurized air line and from the second pressurized air line upstream of the cabin.

20. An aircraft comprising:

a cabin adapted to receive one or more persons;

a rotary airfoil device;

an electric engine drivingly coupled to the rotary airfoil device;

a battery powering the electric engine;

a lubricant subsystem having a lubricant circuit and a lubricant pump operable to circulate a lubricant in the lubricant circuit;

a heat pump having a refrigerant circuit fluidly connecting, in sequence, a compressor, a condenser, an expansion valve, a first evaporator, and an environmental control line branching off from the refrigerant circuit between the condenser and the first evaporator, the environmental control line having a second evaporator and reconnected to the refrigerant circuit between the first evaporator and the compressor, the first evaporator connected in heat exchange relationship with the lubricant circuit; and a pressurized air subsystem having a pressurized air line operable to deliver pressurized air from a pressurized air source to the cabin, the pressurized air line connected in heat exchange relationship with the second evaporator.

* * * * *